Jan. 31, 1961 K. H. MORITZ 2,970,100
MECHANICAL STAGING OF DILUTE FLUID PLATINUM REACTOR BED
Filed May 29, 1959
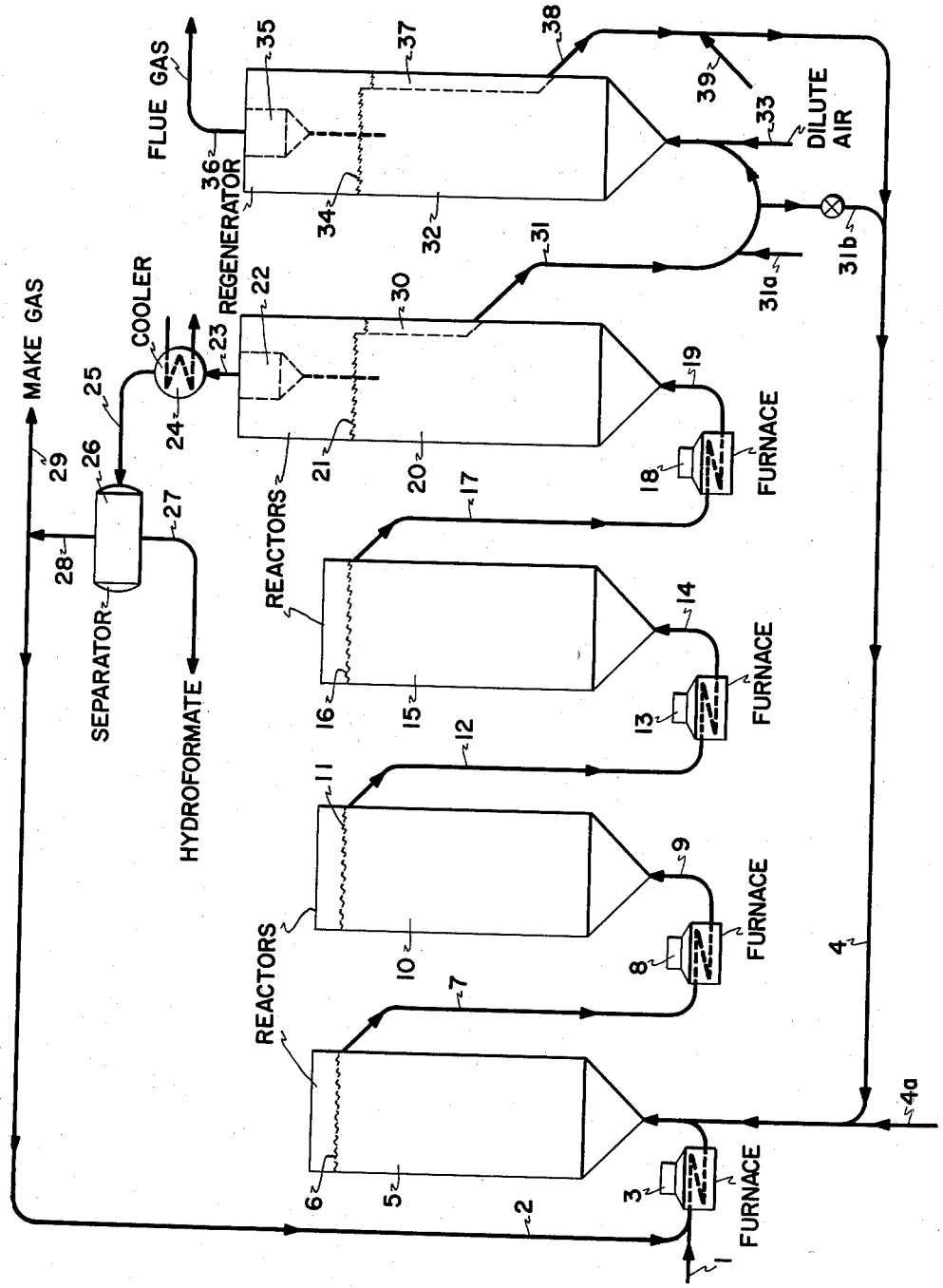
Karsten Herbert Moritz INVENTOR
BY *H. M. Feyrer*
PATENT ATTORNEY United States Patent Office 2,970,100
Patented Jan. 31, 1961

2,970,100
MECHANICAL STAGING OF DILUTE FLUID PLATINUM REACTOR BED

Karsten Herbert Moritz, East Baton Rouge, La., assignor to Esso Research and Engineering Company, a corporation of Delaware Filed May 29, 1959, Ser. No. 816,838

10 Claims. (Cl. 208—65)

The present invention relates to an improved fluidized solids contacting system. More particularly it relates to the type of fluidized solids contacting system in which the fluidizing gases are supplied at such a velocity that the majority of the solid particles assume under hindered settling the form of a dense turbulent liquid simulating bed and are thus retained in the reactor rather than being passed overhead with the fluidizing gases. This bed or dense phase has a definite surface similar to a liquid above which is disposed a disperse phase containing only a small proportion of the total solids. Yet more particularly, this invention relates in a fluid bed system to obtaining staging of the flow of solids and of the fluidizing gases by maintaining separate fluidized beds of solids, and passing solids and fluidizing gases in series from bed to bed by withdrawing both at the surface of each bed and passing them as a combined stream through a U-bend to the next bed. Most particularly, it relates in a preferred embodiment to the use of such a system in fluidized solids hydroforming utilizing a dilute platinum on alumina catalyst.

Hydroforming is well known and is defined as an operation in which a gasoline or naptha stream is treated at elevated temperatures and pressures in the presence of a solid catalytic material and added hydrogen to effect an increase in the octane number of the naphtha treated. An essential characteristic of the process is that no consumption of hydrogen and ordinarily a net production of hydrogen is obtained therein.

The present invention has been found to be particularly advantageous in fluid bed hydroforming utilizing a very dilute platinum catalyst. This catalyst may contain from 0.01 to 1.0 wt. percent Pt preferably 0.01 to 0.06 wt. percent Pt disposed on an activated alumina. The catalyst is preferably prepared by impregnating alumina with a relatively high percentage of platinum to form a catalyst concentrate and mixing this catalyst concentrate with unplatinized alumina to form a heterogeneous catalyst containing the overall percentages of platinum described above.

The present invention will be clearly understood from a consideration of its use in a particular application. Thus, the drawing accompanying this specification presents a diagrammatic illustration of a fluid platinum on alumina catalyst hydroforming system according to this invention. Naphtha feed is supplied through line 1 where it is joined by hydrogen containing recycle gas supplied through line 2 and the combined stream is heated to conversion temperature in furnace 3. From furnace 3 the heated reactants and regenerated catalyst supplied through line 4 or fresh catalyst supplied through line 4a are supplied to reactor 5. Reactant vapors are supplied at such a velocity that a dense fluid bed of catalyst is formed in reactor 5 having a distinct level 6. Partially reacted vapors and catalyst are withdrawn together at the surface 6 of the fluid bed through line 7. Catalyst and vapors are reheated to conversion temperature in furnace 8 (the hydroforming reaction being highly endothermic) and are passed through line 9 to reactor 10 where additional conversion occurs. From reactor 10 vapors and catalyst are again withdrawn together from the surface of the bed 11 through line 12. In furnace 13 the reactants and catalyst are again heated to conversion temperatures and are passed through line 14 to reactor 15. Further conversion again occurs, vapors and catalyst are withdrawn at the surface 16 of the fluid bed, and catalyst and vapors are again passed through line 17 and through furnace 18 and line 19 to final reactor 20. In reactor 20 the hydroformed vapors are passed into the disperse phase above fluid bed level 21 and thence through a cyclone separator 22 where an additional separation of catalyst is accomplished, and this catalyst is returned to the catalyst bed. The essentially catalyst free hydroformate vapors are passed through line 23, condenser 24 and line 25 to separator 26. Here, liquid hydrocarbon products are separated from hydrogen rich recycle gas and the liquid product or hydroformate, having a high octane number, is passed to storage through line 27 for use in gasoline or other uses. Part of the recycle gas passed overhead from separator 26 through line 28 is removed from the system as excess make gas through line 29 and the remainder is recycled to reactor 5 through line 2 as previously described.

Catalyst is withdrawn from final reactor 20 through catalyst withdrawal channel 30 and line 31. The catalyst may be stripped of hydrogen and hydrocarbons with steam or inert gas supplied through line 31a and then may be passed to regenerator 32 or recycled thru line 31b if desired. In the regenerator carbon is burned off the catalyst by a dilute air stream supplied through line 33 which fluidizes the catalyst bed having level 34. Flue gases pass from said fluid bed through cyclone separator 35 where the last traces of entrained catalyst are removed and are returned to the fluid bed, and the regenerator flue gas is passed from the cyclone separator by line 36 to the atmosphere. Regenerated catalyst is withdrawn through channel 37 and line 38, is stripped of flue gases by inert gas supplied through line 39 and is returned through line 4 to initial reactor 5 as previously described.

The fluidization contacting system of the present invention may be further defined from a consideration of the velocities of fluidizing gas utilized to fluidize the various sizes of solids employed in the reactors. Thus, velocities of 0.1 to 1.0, preferably 0.4 to 0.6, ft./sec. are utilized with large size particles in the range of 50 microns to 200 microns, preferably 80 microns to 120 microns. It is, of course, contemplated that particles larger than 200 microns also may be utilized in this invention. Likewise velocities of 0.03 to 0.4, preferably 0.1 to 0.3, ft./sec. are utilized with smaller size particles in the range of 1 to 50 microns, preferably 10 to 30 microns. It should be noted that by utilizing velocities within the ranges above described, a fluidized bed is defined in the reactors and catalyst circulation rates can be controlled as desired. This distinguishes the present invention from transfer line operations wherein velocities of 10 to 30 ft./sec. (i.e. outside the above ranges) are utilized and where the low solids circulation rates of the present invention cannot be obtained. For example, with the present invention solids circulation rates of 0.01 to 1000, preferably 100 to 500#/hr./ft.$^2$ of reactor cross section can be obtained. For comparison purposes, utilizing transfer line operations these solids transfer circulation rates are in the range of 60,000 to 300,000, preferably 100,000 to 200,000 #/hr./ft.$^2$ of reactor cross section— (which circulation rates are outside the ranges of the present invention).

Having described a particular embodiment of the present invention, that of a fluidized solids platinum on alumina hydroforming process, the advantages of the present method of staging a fluidized solids bed will now be considered generally.

In the prior art it is known to obtain staging by withdrawing catalyst and vapors from above the fluid bed, either from the side of the vessel in the disperse phase region thereof, or directly overhead from the top of the vessel. However, when such a method of withdrawal is attempted, a large disperse phase above the fluid bed of solids invariably is obtained. This is deleterious always in that thus the volumetric efficiency of the reactor is reduced. Additionally, in processes such as, for example, hydroforming the presence of such a disperse phase in the reaction zone leads to deleterious cracking which reduces the yield of desired product from the process.

Another disadvantage of the overhead withdrawal of catalyst and vapors method of staging a fluid bed of solids is that an elutriation or separation of smaller particles overhead occurs in the disperse phase which results in a lack of uniformity of catalyst in the catalyst beds in the different reactors. Additionally of course these smaller particles also circulate more rapidly through the reactors than do the larger particles, thus resulting in a heavier load of fines on the cyclones, poorer fluidization in the various catalyst beds, non uniform frequency of regeneration for the different size particles, and deleterious backmixing of larger particles from bed to bed thus decreasing the staging obtained. This elutriation is effectively prevented in the present invention method of staging in that a uniform size distribution of particles is withdrawn from the fluid beds (due to the violent mixing occurring within the fluid bed) and in the U-bends no backmixing occurs. A further and final disadvantage of the overhead withdrawal of catalyst and vapors system is that in such a system it is not possible to withdraw vapors between stages in that all the vapors are needed for transport of the catalyst overhead. Such stagewise withdrawal of part of the reaction gases might be advantageous for example where high severity reaction conditions are employed. Thus, in hydroforming a withdrawal of part of the already reformed products from each stage could be used to minimize degradation occurring in the latter reactors. As another example in certain adsorption and desorption processes different amounts of fluidizing gases may be available from each reactor due to the material removed from or added to the adsorbent as it passes through the various reactors.

The disadvantages above described obviously also are obtained where horizontal baffles are used to obtain staging of the catalyst bed. Thus, for example, it is well known that a large disperse phase results under each of the baffles disposed in a fluid bed. Particularly, although a great variety of designs of baffles have been tried, nevertheless it has not been possible to obtain minimum backmixing without at the same time incurring a large disperse phase below the baffle.

The following data presented in Examples 1 through 4 illustrate the advantages of this invention.

EXAMPLE 1

Nitrogen was supplied as the fluidizing gas in a system as described in Figure 1 wherein the reactors were 2 inch diameter glass vessels which will be identified in the following table as $a$, $b$, $c$ and $d$. The particles fluidized were mainly in the size range of 10 to 200 microns. Pressure drops across each reactor were measured with manometers. It could be seen through the glass wall of the reactors that even fluidization was obtained, along with uniform heights of the fluid beds controlled by the level of the drawoff from each reactor, and also even flow of catalyst through the reactor system. In the particular reactors utilized, the height of the fluid bed was 12 inches with a 2 inch disperse phase region existing above the level of the fluid bed in each reactor. However, it should be noted that this disperse phase region could be greatly reduced merely by locating the withdrawal of catalyst and vapors line very near the top of the reactors. The results obtained are reported in Table I.

Table I

| Reactors | Pressure Drop (in $H_2O$) | Apparent Holdup (lbs.) | Gas Velocity (ft./sec.) |
| --- | --- | --- | --- |
| a | 6.8 | 0.63 | 0.22 |
| b | 6.7 | 0.62 | 0.22 |
| c | 7.2 | 0.67 | 0.22 |
| d | 6.3 | 0.59 | 0.22 |
| a | 6.1 | 0.57 | 0.09 |
| b | 6.3 | 0.59 | 0.09 |
| c | 6.3 | 0.59 | 0.09 |
| d | 6.2 | 0.58 | 0.09 |

It can be seen from Table I that the holdup in the vessels was uniform and that likewise the pressure drop in all four vessels was also uniform. The slight drift toward higher pressure drop at higher gas velocities and hence apparent higher holdups was probably due to the increased friction losses so occurring. The total upstream pressure used in these experiments was 3 p.s.i.g. Thus, according to Table I only around 2 p.s.i.g. were consumed by friction losses through the vessels which is a very low loss for 4 complete staging, U-bend vessels. It can thus be seen that the present process is fully operable and highly efficient.

EXAMPLE 2

The following data summarized in Table 2 obtained in the laboratory are specific for a so-called pyramid baffle which was designed for limited solids backmixing. Different baffles, of course, will give different results, but these data are typical and illustrate for baffles the interdependence of percent open area, pressure drop, and slids backmixing at different velocities of fluidizing gas.

Table II.—Pyramid trays

| | | | |
| --- | --- | --- | --- |
| Percent Open Area of Baffle | 2.0 | 3.7 | 5.2 |
| Percent Solids Return [1] | 0.8 | 2.2 | 3.8 |
| Height of Disperse Phase at: | | | |
| 0.2 ft./sec. ............ inches | 6 | 0 | |
| 0.3 ft./sec. ............ do | 15 | 4 | 1 |
| 0.8 ft./sec. ............ do | | 28 | |

[1] Data obtained using 0.3 ft./sec. velocity of fluidizing gas.

Thus from the data as the open area is increased, at a given gas velocity, the height or depth of the disperse phase is decreased caused by the decrease in the pressure drop across the baffle. However, at the same time the amount of solids return is increased, indicating a larger extent of backmixing. Thus, from the table conventional baffles allow considerable backmixing and although this backmixing can be reduced by increasing the pressure drop across the baffle this causes below the baffle a deleterious disperse phase. Thus, although increasing pressure drop between stages (both where baffles are used and where overhead disperse phase transfer between vessels is used) decreases backmixing, this decrease is obtained only at the expense of increasing the size of the deleterious disperse phase present. The present invention use of U-bends not only eliminates the necessity for the presence of a large disperse phase above the fluid bed but also efficiently prevents backmixing. The excellence of this seal present in the U-bend preventing backmixing is well demonstrated in conventional 2-vessel fluid hydroforming where such a seal separates oxygen containing regeneration gases from explosive hydroforming naphtha vapors.

Another illustration of the extent of the disperse phase built up beneath baffles in commercial reactors can be seen from the data reported in Example 3.

EXAMPLE 3

With an actual combination tray tested for possible installation in a commercial hydroformer there was produced an 18 inch dispersed phase below the baffle when operating at design conditions. In this commercial reactor this amounts to a loss of reactor volume of about 4½% in addition to the disperse phase deleterious cracking which is known to take place.

EXAMPLE 4

A 180° F. to 350° F. boiling range virgin naphtha is hydroformed to 104 research clear octane number in the system described in the example. The catalyst comprises a 0.03 wt. percent of platinum supported on an activated alumina support. Its particle size is mainly within the range of 10 to 200 microns.

Reactor pressure is 200 p.s.i.g., recycle gas rate is 5000 s.c.f./b. and the temperature in each of the four reactors is 950° F. Space velocities of the naphtha feed is 0.15 pound of oil per hour per pound of catalyst in one reactor and catalyst circulation to the regenerator is 0.6 pound of catalyst per hour per pound of catalyst in all the reactors. The regenerator is operated at a temperature of 1050° F. and a pressure of 205 p.s.i.g. The velocities of the fluidizing gases in the reactors is 0.3 ft./sec. It should be noted that extremely high octane numbers are obtainable by the process of this invention. For comparison, it is estimated that a single (unstaged) reactor at these conditions would produce a product having an octane number of only 90 research clear octane number.

Another advantage for the present process lies in the fact that the catalyst holdup in each vessel may be easily varied merely by changing the height of the catalyst draw-off in the vessel. This would be quite important since in many conversion processes different loadings of catalyst in the different reactors would, of course, be more difficult in any of the other types of staging described above. In addition the present process would be suitable for easy modification of conventional reactors.

Other methods of controlling the level of the catalyst beds are also contemplated according to the present invention. Thus, the catalyst may be drawn off from a point below the level of the fluid bed, the level of the bed being controlled by a venturi or valve in the U-bend transfer line.

What is claimed is:

1. An improved method for effecting the catalytic conversion of hydrocarbons in a number of reaction zones in series which comprises supplying finely divided solid catalyst particles and vaporous reactants to the bottom of each reaction zone of the series controlling the superficial velocity of the reactant vapors through each reaction zone so that the majority of the solid catalyst particles in said reaction zones assume, under hindered settling, the form of a dense, turbulent, liquid-simulating bed having a defined surface level, withdrawing the vaporous reaction products and finely divided catalyst particles from the surface of the dense bed in each of the reaction zones except the last of the series and supplying the same to the bottom of the next reaction zone of the series, withdrawing solid catalyst particles essentially free of reactants from the dense bed in the last reaction zone of the series and separately withdrawing vaporous reaction products essentially free of catalyst particles overhead from the last of said reaction zones.

2. The process of claim 1 in which solids are circulated from each reaction zone to the next reaction zone of the series at rates in the range of 1 to 1000#/hr./ft.$^2$ of reactor cross section.

3. The process of claim 1 in which the velocities of the vaporous reactants in the several reaction zones are within the range of 0.1 to 1.0 ft./sec. and the solid particles are mainly in the size range of 50 to 200 microns.

4. The process of claim 1 in which the velocities of the vaporous reactants in the several reaction zones are in the range of 0.03 to 0.4 ft./sec. and the solid particles are mainly in the size range of 1 to 50 microns.

5. The process of claim 1 in which the solids are circulated from each reaction zone to the next reaction zone of the series at rates in the range of 100 to 500#/hr./ft.$^2$ of reactor cross section.

6. An improved method for hydroforming hydrocarbon fractions in a number of reaction zones in series which comprises supplying finely divided hydroforming catalyst particles and vaporous reactants comprising hydrocarbons and hydrogen to the bottom of each reaction zone of the series, controlling the superficial velocity of the vaporous reactants through each reaction zone so that the majority of the solid catalyst particles in said reaction zones assume, under hindered settling, the form of a dense, turbulent, liquid-simulating bed having a defined surface level, withdrawing vaporous reactants and finely divided catalyst particles from the surface of the dense bed in each of the reaction zones except the last of the series and supplying the same to the bottom of the next reaction zone of the series, maintaining active hydroforming conditions of temperature and pressure in the several reaction zones to effect the desired conversion of the hydrocarbons, withdrawing solid catalyst particles essentially free from vaporous reactants from the dense bed in the last reaction zone of the series and separately withdrawing vaporous reaction products essentially free of catalyst particles overhead from the last of said reaction zones.

7. The process as defined in claim 6 in which the catalyst withdrawn from the last reaction zone is recycled to the first reaction zone of the series.

8. The process as defined in claim 6 in which the catalyst withdrawn from the last reaction zone is treated with an oxygen containing gas at elevated temperatures to remove carbonaceous deposits and is then recycled to the first reaction zone of the series.

9. The process as defined in claim 6 in which the hydroforming catalyst consists essentially of platinum-on-alumina and the catalyst withdrawn from the last reaction zone is recycled to the first reaction zone of the series.

10. The process as defined in claim 6 in which the hydroforming catalyst consists essentially of platinum-on-alumina and the catalyst withdrawn from the last reaction zone is treated with an oxygen containing gas at elevated temperatures to remove carbonaceous deposits and is then recycled to the first reaction zone of the series.

References Cited in the file of this patent

UNITED STATES PATENTS

| 2,432,822 | Secor | Dec. 16, 1947 |
| 2,758,066 | Brackin | Aug. 7, 1956 |

FOREIGN PATENTS

| 1,105,614 | France | July 6, 1955 |